US008644559B2

(12) United States Patent
Sakata

(10) Patent No.: US 8,644,559 B2
(45) Date of Patent: Feb. 4, 2014

(54) IMAGE PROCESSING DEVICE AND IMAGE PROCESSING METHOD

(75) Inventor: Seiichiro Sakata, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 86 days.

(21) Appl. No.: 13/358,221

(22) Filed: Jan. 25, 2012

(65) Prior Publication Data

US 2012/0243738 A1 Sep. 27, 2012

(30) Foreign Application Priority Data

Mar. 25, 2011 (JP) .................................. 2011-67164

(51) Int. Cl.
*G06K 9/00* (2006.01)
*G06K 9/34* (2006.01)
(52) U.S. Cl.
USPC ............................. 382/103; 382/107; 382/173
(58) Field of Classification Search
USPC .......................................... 382/103, 107, 173
See application file for complete search history.

(56) References Cited

U.S. PATENT DOCUMENTS

| 8,219,438 | B1* | 7/2012 | Moon et al. ................... 705/7.29 |
| 8,300,935 | B2* | 10/2012 | Distante et al. ............... 382/173 |
| 2006/0018516 | A1* | 1/2006 | Masoud et al. ............... 382/115 |
| 2006/0257048 | A1* | 11/2006 | Lin et al. ....................... 382/276 |
| 2007/0263899 | A1* | 11/2007 | Garoutte ....................... 382/103 |
| 2009/0079813 | A1* | 3/2009 | Hildreth ...................... 348/14.03 |
| 2010/0011297 | A1* | 1/2010 | Tsai et al. ..................... 715/721 |
| 2010/0104018 | A1* | 4/2010 | Bregler et al. ............ 375/240.16 |
| 2010/0321503 | A1* | 12/2010 | Sakata .......................... 348/169 |

FOREIGN PATENT DOCUMENTS

| JP | 2004-164480 | 6/2004 |
| JP | 2008-283379 | 11/2008 |
| JP | 2010-273281 | 12/2010 |

OTHER PUBLICATIONS

Lu et al., "An improved motion detection method for real-time surveillance", IAENG International Journal of Computer SCience, 35:1, IJCS_35_1_16, published online 2008.*
Wheeler et a., "Face recognition at a distance system for surveillance applications", in 4th IEEE Conf on BTAS, 2010.*
Vaquero et al., "Attribute-based people search in surveillance environments", IEEE Workshop on Applications of Computer Vision, 2009.*

* cited by examiner

*Primary Examiner* — Anand Bhatnagar
*Assistant Examiner* — Soo Park
(74) *Attorney, Agent, or Firm* — Volpe and Koenig, P.C.

(57) ABSTRACT

An image processing device comprises: a tracking area setting unit that sets a tracking area in an input moving image obtained by photographing an object; a following feature point setting unit that detects a feature point that exhibits a motion in correlation with the motion of the tracking area and sets the detected feature point as a following feature point; a motion detection unit that detects movement over time of the following feature point within the input image; and a clip area setting unit that sets a clip area of an image to be employed when a partial image including the tracking area is clipped out of the input image for either recording or displaying or both recording and displaying, and that sets a size and a position of the clip area on the basis of a motion detection result obtained by the motion detection unit.

7 Claims, 8 Drawing Sheets

IMAGE PROCESSING DEVICE AND IMAGE PROCESSING METHOD

CROSS REFERENCE TO RELATED APPLICATION(S)

This application claims priority on the basis of JP2011-67164, filed with the Japan Patent Office on Mar. 25, 2011, the entire contents of which are incorporated herein by reference.

FIELD OF INVENTION

This invention relates to a technique for clipping an image in an area corresponding to movement of an object of interest within a moving image obtained through image pickup.

BACKGROUND

In a known technique, image recognition is performed during image pickup, whereupon focus adjustment, exposure adjustment, color balance adjustment, and so on are performed mainly to an object recognized as an object of interest. In another known technique, a facial expression of a person is recognized and a release operation is started when it is determined that the object is smiling.

JP2008-283379A discloses a technique in which a facial image of an object is detected from a plurality of image frames generated by an image pickup unit, whereupon the facial image is tracked continuously. In this technique, in a situation where the object turns away or the like so that the facial image can no longer be detected, a facial image corresponding portion corresponding to the facial image is set by performing moving body analysis between adjacent image frames. The facial image corresponding portion is then tracked until the facial image can be detected again. Image pickup control is performed on the basis of the facial image or the facial image corresponding portion.

JP2010-273281A discloses an image pickup device that performs image pickup automatically when a smiling face of an object is detected. The image pickup device includes detection means and control means. After a number of captured smiling face images showing the smiling face of the object reaches a reference number, the detection means then starts to detect an expression or a gesture other than the smiling face of the object. When an expression or a gesture other than the smiling face is detected by the detection means, the control means executes image pickup automatically.

JP2004-164480A discloses a technique for detecting a posture or various parts of a person from a silhouette image of the person. In this technique, an outline of the person is detected from the silhouette image of the person and analyzed. The outline is turned into a simple graphic and subjected to skeletonizing processing, and finally, a center line of the person is detected as a bone axis.

SUMMARY

In one aspect of the invention, an image processing device is provided. The image processing device comprises: a tracking area setting unit that sets a tracking area in an input moving image obtained by photographing an object; a following feature point setting unit that detects a feature point that exhibits a motion in correlation with the motion of the tracking area and sets the detected feature point as a following feature point; a motion detection unit that detects movement over time of the following feature point within the input image; and a clip area setting unit that sets a clip area of an image to be employed when a partial image including the tracking area is clipped out of the input image for either recording or displaying or both recording and displaying, and that sets a size and a position of the clip area on the basis of a motion detection result obtained by the motion detection unit.

In another aspect of the invention, an image processing method is provided. The image processing method comprises: setting a tracking area in an input moving image obtained by photographing an object; detecting a following feature point, which is a feature point that exhibits a motion in correlation with the motion with the tracking area and setting the detected feature point as the following feature point; detecting movement over time of the following feature point within the input image; and setting a size and a position of a clip area of an image to be employed when a partial image including the tracking area is clipped out of the input image for either recording or displaying or both recording and displaying on the basis of a motion detection result obtained by the step of detecting movement.

BRIEF DESCRIPTION OF THE DRAWING(S)

The present invention is described in detail below with reference to the following Figures.

DETAILED DESCRIPTION OF THE PREFERRED EMBODIMENT(S)

Figure 1:
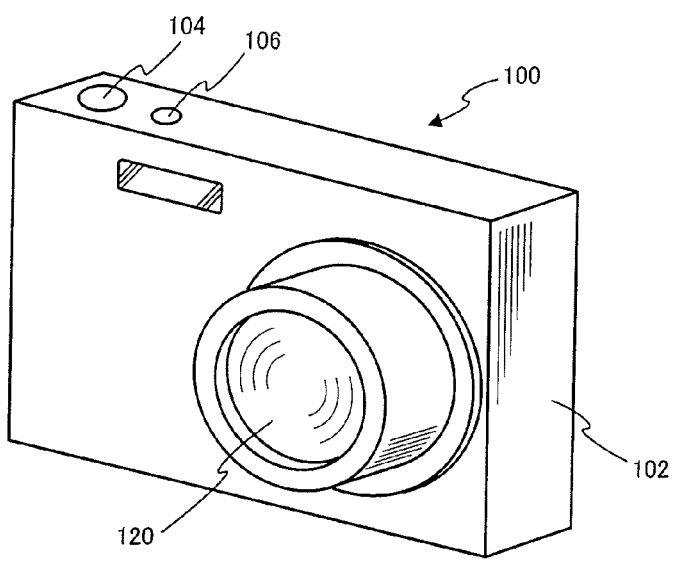
FIG. 1 is a perspective view showing the outer form of a front side of a digital camera.

FIG. 1 is a view showing a digital camera 100 including an image processing device according to an embodiment of this invention from a front side. The digital camera 100 shown in FIG. 1 is configured to be capable of photographing still images and moving images. The digital camera 100 includes a camera main body 102, a release switch 104, a power switch 106, and an imaging lens 120.

Figure 2:
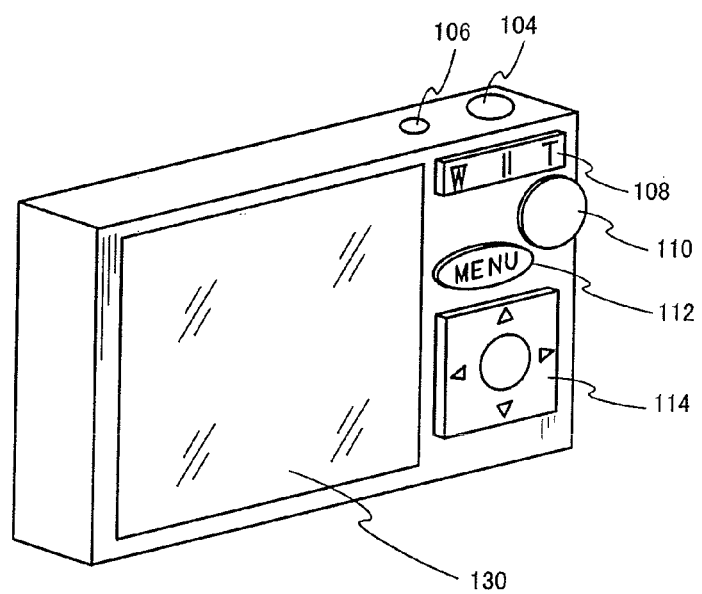
FIG. 2 is a perspective view showing the outer form of a back side of the digital camera.

FIG. 2 is a view showing the digital camera 100 from a back side. A zoom switch 108, a dial switch 110, a menu switch 112, a seesaw-type switch 114, and a display device 130 are provided on the back side of the digital camera 100.

A power of the digital camera 100 can be switched from OFF to ON or from ON to OFF by pressing the power switch 106. Image pickup of a still image or a moving image can be started by pressing the release switch 104. Further, by pressing the release switch 104 while the digital camera 100 performs an image pickup operation in a moving image recording mode, the image pickup operation can be stopped.

The imaging lens 120 includes a fixed focal length imaging optical system or a variable focal length imaging optical system, an aperture adjustment mechanism, and a focus adjustment mechanism. When the digital camera 100 is a lens shutter type camera, the imaging lens 120 also includes a lens shutter mechanism. Further, when the imaging optical system of the imaging lens 120 is a type of variable focal length, a focal length varying mechanism for varying a focal length is also provided. It is assumed in this embodiment that the imaging lens 120 includes a variable focal length imaging optical system and an electric focal length varying mechanism. A user can vary the focal length of the imaging lens 120 by operating the zoom switch 108.

The dial switch 110 is operated to switch an operating mode of the digital camera 100 (between a still image recording mode and the moving image recording mode, and in the still image recording mode between exposure modes such as an aperture priority automatic exposure mode, a shutter speed priority automatic exposure mode, a manual exposure mode, and a programmed automatic exposure mode).

The menu switch 112 is pressed to start an operation for displaying a menu operation screen used to perform various custom settings on the digital camera 100 on the display device 130 and modifying the settings. The seesaw-type switch 114 is used to switch to a desired setting by moving a cursor over the menu operation screen.

The display device 130 includes a color liquid crystal display panel and a backlight device, and is configured to be capable of displaying images, menu screens, information, and so on. The display device 130 is also configured to be capable of performing live view display during an image pickup preparation operation or an image pickup operation. The display device 130 may be constituted by an organic EL display device or the like. The digital camera 100 may include an electronic viewfinder such that a similar display to that displayed on the display device 130 is displayed in the electronic viewfinder.

The digital camera 100 is configured to be capable of performing image clipping (image cropping) when a moving image is recorded in the moving image pickup mode. Image clipping means generating a separate moving image by clipping a partial image from respective frames of an input moving image obtained from an image pickup unit 306. A moving image generated in the aforesaid manner will be referred to in this specification as a clipped moving image. The digital camera 100 is configured to be capable of either displaying or recording, or both displaying and recording, a generated clipped moving image. The following description will focus on a case in which the digital camera 100 operates in the moving image pickup mode and image clipping is performed at the same time and the clipped moving image is displayed and recorded.

Figure 3:
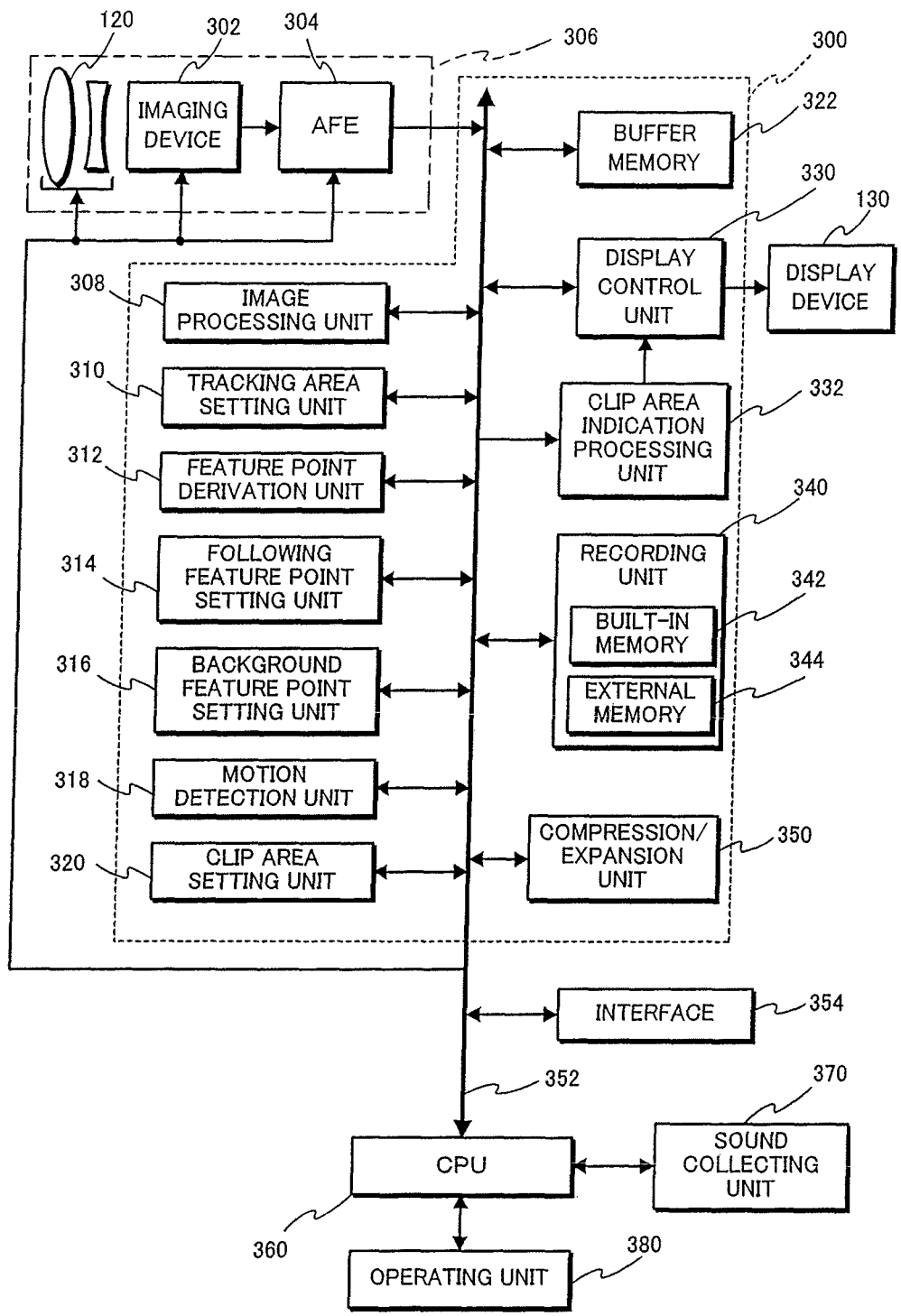
FIG. 3 is a block diagram showing an internal constitution of the digital camera.

FIG. 3 is a schematic block diagram illustrating an internal constitution of the digital camera 100. The digital camera 100 includes the image pickup unit 306, an image processing device 300, a system bus 352, an interface 354, a CPU 360, a sound collecting unit 370, an operating unit 380, and the display device 130.

The image pickup unit 306 includes the imaging lens 120, an imaging device 302, and an analog front end 304. These constitutional elements are electrically connected to the CPU 360. The imaging device 302 is an image sensor configured to be capable of generating a color image signal by subjecting an object image formed by the imaging lens 120 to photo-electric conversion. A CCD image sensor, a CMOS image sensor, and so on may be used as the imaging device 302. The analog front end 304 generates digital image data by performing processing such as CDS (Correlated Double Sampling), amplification, and A/D conversion on an analog image signal output from the imaging device 302. When the imaging device 302 is a CMOS image sensor, the analog front end 304 may be formed integrally with the imaging device 302.

The image processing device 300 includes an image processing unit 308, a tracking area setting unit 310, a feature point derivation unit 312, a following feature point setting unit 314, a background feature point setting unit 316, a motion detection unit 318, a clip area setting unit 320, a buffer memory 322, a display control unit 330, a clip area indication processing unit 332, a recording unit 340, and a compression/expansion unit 350. These constitutional elements, as well as the interface 354, the CPU 360, and the analog front end 304, are electrically connected to each other via the system bus 352.

The buffer memory 322 is constituted by an SDRAM (Synchronous Dynamic Random Access Memory) or the like having a comparatively high access speed. Further, the buffer memory 322 can be accessed from the CPU 360 via the system bus 352.

Figure 4A:
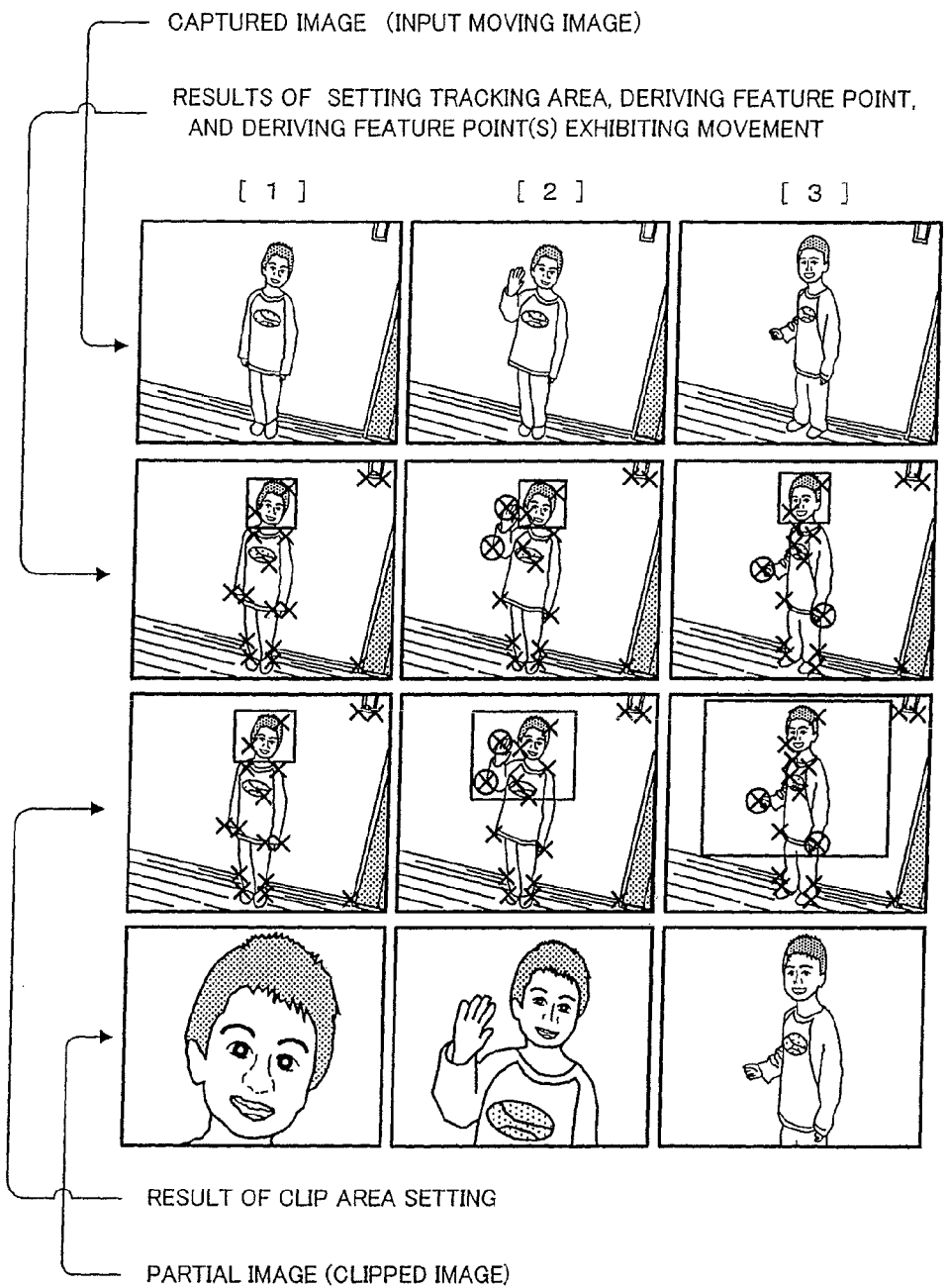
FIG. 4A is a schematic view illustrating the manner in which input images that vary over time are processed sequentially by an image processing device.
Figure 4B:
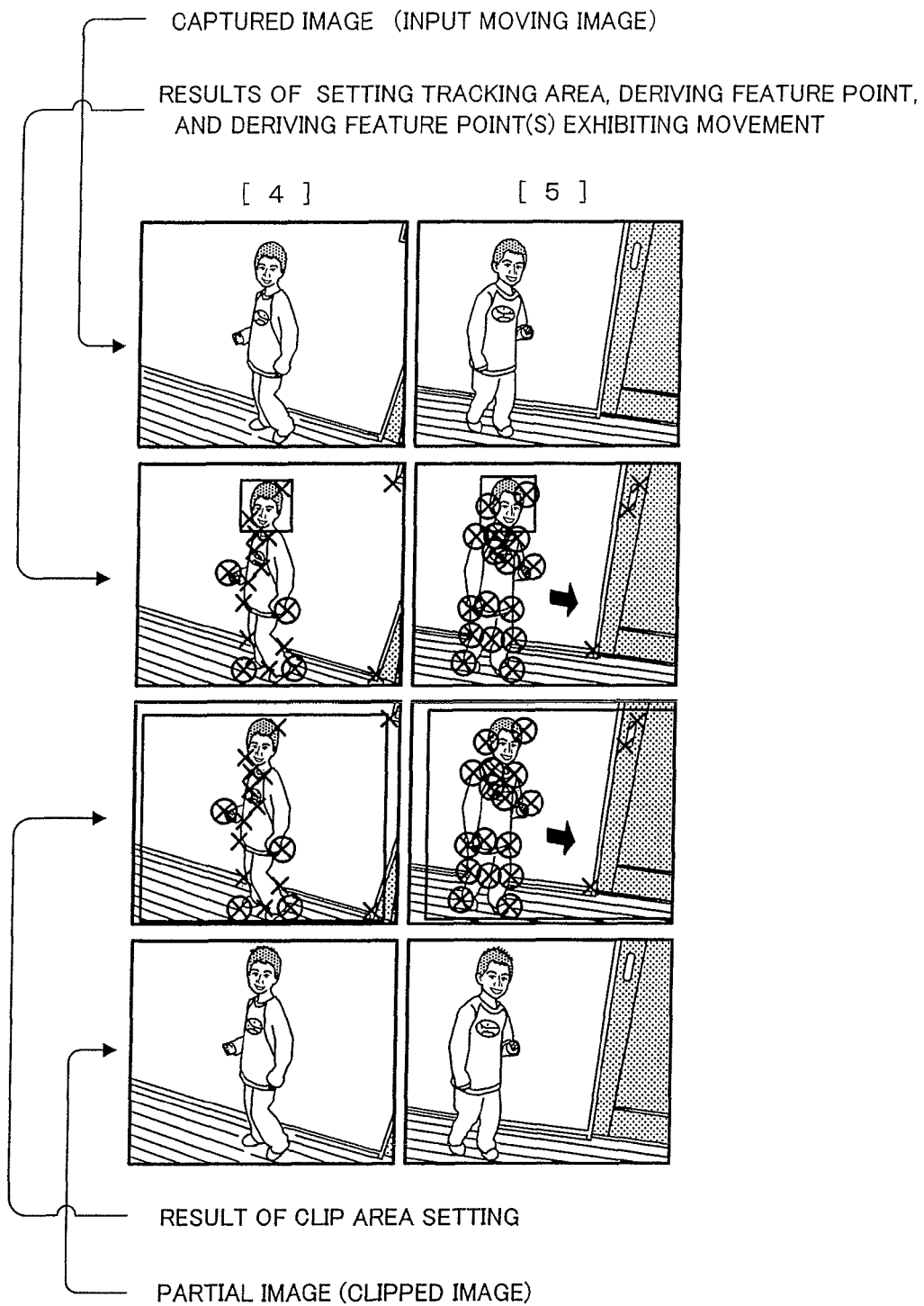
FIG. 4B is a schematic view following FIG. 4A, which illustrates the manner in which input images that vary over time are processed sequentially by the image processing device.

Processing performed by the respective constitutional elements of the image processing device 300 will be described below with appropriate reference to FIGS. 4A and 4B. FIG. 4 is a schematic view illustrating the manner in which an input moving image that varies over time is processed sequentially by the image processing device 300. FIG. 4 shows how processing is performed on an input moving image obtained at a certain timing by using four images arranged in vertical series as a single group. Further, FIG. 4 shows the manner in which processing results vary in accordance with variation in the input moving image over time, i.e. at timings [1], [2], . . . [5].

The image processing unit 308 generates color image data by performing processing such as optical black subtraction, demosaicing (the demosaicing may be omitted when the imaging device 302 is a multi-plate type device), white balance adjustment, hue/chroma/contrast adjustment, edge enhancement, and noise reduction on digital image data output from the analog front end 304 and stored temporarily in the buffer memory 322. The generated color image data are image data in three primary colors R (red), G (green), and B (blue) or a larger number of primary colors. Further, the image processing unit 308 generates image data in a color space such as YCbCr or HSV from the color image data obtained by performing the aforesaid processing, generates image data represented only by a Y channel and a V channel of the color space (this image data is referred to in this specification as luminance image data), and stores the generated image data temporarily in the buffer memory 322. By using the luminance image data, a processing load exerted on the image processing device 300 during processing to be described below can be reduced. The reason for this is that since color information is removed, a data amount of an image can be reduced even in a condition that the pixel size is the same. Depending on a processing capacity and an object of the image processing device 300, of course, the following processing may be performed using the color image data. Furthermore, various methods other than the method described above may be employed as the method of generating the luminance image data. For example, G image data alone may be extracted from RGB color image data and used instead of the luminance image data.

The tracking area setting unit 310 sets an area in which a tracking subject exists within a moving image (to be referred to as an input moving image) obtained when the image pickup unit 306 photographs an object, or in other words a tracking area. Various methods may be used to set the tracking area. For example, an area including an object image that is marked with a rectangular focus frame displayed as an overlay on a live view display image when the release switch 104 is pressed to start recording moving image may be set as the tracking area. Alternatively, a transparent touch panel switch may be provided on a display panel of the display device 130. In this case, the user can set an area including a desired object within an object image existing in a displayed live view display image as the tracking area by touching the desired object image with a fingertip or the like. Further, the face of a person or an animal may be recognized within the input image, and an area including the face can be set as the tracking area. Moreover, when a plurality of people or other objects exist in the input image, an area including an object in the closest position, an object that appears largest, or an object having the highest contrast may be set as the tracking area. Furthermore, an image of the face of a specific object may be registered in advance, and during the image pickup preparation operation or the image pickup operation, pattern recognition processing may be performed repeatedly. An area having a pattern that matches a pattern of the registered image to a high degree may then be set as the tracking area.

A case in which a part including the face (a head portion) of a person or an animal is set as the tracking area will be described below. FIG. 4 shows four images arranged in a vertical direction in accordance with respective timings [1], [2], . . . , [5]. In a second image from the top of the images corresponding to the respective timings, a rectangle surrounds the face (head portion) of a person. The rectangle indicates the tracking area.

The feature point derivation unit 312 performs processing to derive feature points by analyzing the images (the luminance image data) on all of the frames constituting the input moving image. Alternatively, depending on the processing capacity of the image processing device 300, the processing may be performed every time images of a predetermined number of frames are input. Here, the feature points are points marked with an x in the examples shown in FIG. 4. A derived feature point preferably has an edge component in a two-dimensional direction since variation over time in a position thereof in up-down and left-right directions in a captured image will be followed thereafter. As a method of extracting a feature point having this quality, a two-dimensional image formed from luminance image data may be divided into mesh form, and a two-dimensional Fourier transform may be performed on the image data in each divided region. When an edge component is detected in a two-dimensional direction within each divided region, it may be determined that a feature point exists therein. Alternatively, various well-known types of corner detection processing may be used. Further, a detected point detected using a well-known corner detection method such as Harris or SUSAN, or a detected point determined by a feature amount calculation of an image through deriving a Laplacian of a Gaussian image or difference calculation such as LoG (Laplacian of Gaussian) or Dog (Difference of Gaussian), may be used as the feature point. Furthermore, a center point or a center of gravity point in identical color regions (regions having an identical tone) specified in the input image on the basis of hue and chroma data obtained by subjecting a color image to HSV conversion may be used as the feature point. In the example shown in FIG. 4, feature points are derived with respect to corner portions of lighting device switches provided on wall surfaces, tip ends of hair, cuffs of clothing, lower edges of slacks, designs on clothing, points intersecting with boundary lines between the floor and the walls and the contours of the person's legs, and so on. Identification symbols are allocated to the respective feature points and registered together with information such as coordinate values in the captured image.

The following feature point setting unit 314 detects and sets following feature points that follow after the tracking area from the feature points derived by the feature point derivation unit 312. A following feature point is a feature point exhibiting movement that follows the movement of the tracking area (in this embodiment, the area in which the face of the person as the subject to be tracked exists). In other words, when the tracking subject is the face of a person, feature points corresponding to the face, parts (hair, a hat, accessories, and so on) in the vicinity of the face, and the entire body (parts other than the face) of the person are set as the following feature points. At this time, feature points on and in the vicinity of the face within the tracking area, from among the feature points derived by the feature point derivation unit 312, are set as face portion feature points. Here, motion is defined as an amount of movement by a following feature point on an object as the subject to be tracked. A movement amount of a following feature point between frames constituting the input image, which is expressed using pixels as units (i.e. a moved pixel amount), for example, may be used. It should be noted, however, that the movement is preferably derived from a relative inter-frame movement amount of the following feature point itself after removing movement of the image as a whole caused by hand unsteadiness and so on. For example, the moved pixel amount may be determined from a difference between an absolute amount of inter-frame movement of the following feature point and an absolute amount of inter-frame movement of the image as a whole, and the result may be set as the aforesaid movement amount. FIG. 4 shows an example in which two feature points are set inside a frame indicating the tracking area in the second image from the top at each timing [1], [2], . . . , [5], and these feature points correspond to face portion feature points. Further, feature points in parts of the body other than the face that are connected to the tracking area are set as remnant feature points. In FIG. 4, feature points set on the shoulders, chest, hands and feet, and so on of the body (the part from the neck down), which are connected to the face in the tracking area, correspond to remnant feature points. The following feature points may be set by analyzing the input moving image for a while after the tracking area has been set by the tracking area setting unit 310 in order to detect feature points exhibiting movement having a high degree of correlation with the movement of the tracking area.

In the example described above, an area including the face of a person is set as the tracking area, and feature points exhibiting movement that follows the movement of the tracking area are set as the following feature points. However, the tracking area is not limited to the face of a person, and an area including the face part of an animal, a flower part of a plant, a leading part of an automobile or a railway vehicle, and so on may also be set as the tracking area. In this case, feature points in or in the vicinity of the face part, flower part, or leading part may be set as the face portion feature points. Further, feature points in parts connected to these parts may be set as the remnant feature points.

The background feature point setting unit 316 analyzes the movement over time of the feature points derived and registered by the feature point derivation unit 312 within the input moving image, and groups the feature points according to the movement amount and a movement direction (a movement pattern) thereof. As a result, the feature points are separated into a plurality of groups. One of the plurality of groups is a following feature point group. One or a plurality of groups having feature points that move in similar directions by similar amounts are formed as the other groups. The background feature point setting unit 316 classifies a group having the largest number of feature points, from among the one or a plurality of groups, as a background feature point group. Alternatively, a group having the feature points that are dispersed over the widest range may be classified as the background feature point group. During grouping, group attribute information indicating the group to which the feature point belongs may be added to the registration information corresponding to each feature point. As a result, feature points indicating pedestrians and moving bodies such as vehicles passing in front of or behind the tracking subject can be differentiated from the background feature points.

The motion detection unit 318 detects movement of the following feature points relative to the background feature points. For example, even if neither the entire body of the tracking subject, including the face, nor the background moves, the feature points in the input moving image move as a whole when the digital camera 100 is subject to a panning operation or a tilting operation. At such times, the movement of the feature points belonging to the following feature point group can be detected by detecting the movement of the following feature points relative to the background feature points.

In the second and third images from the top at each timing [1], [2], . . . , [5] in FIG. 4, the feature points in which the motion detection unit 318 detects movement are indicated by an x in a circle. Image pickup conditions at the respective timings will now be described. At the timing [1], a person standing against a wall exhibits substantially no movement, and therefore the motion detection unit 318 does not detect movement in any feature points. At the timing [2], a right arm of the person is raised, and movement is detected in feature points corresponding to a right elbow and a right hand. It should be noted that the number of feature points may increase or decrease in accordance with variation in the image pickup condition, and therefore grouping is performed successively.

At the timing [3], the person has lowered his right arm from the condition at the timing [2] and turned his waist such that his upper body is oriented rightward, and movement is detected in the feature points corresponding to the right hand and the left hand. At the timing [4], the person has moved from his feet such that his whole body is oriented rightward, and movement is detected in the feature points corresponding to the left and right hands and feet. At the timing [5], the person has started to walk to the left hand side, and a panning operation of the digital camera has been done in a rightward direction toward the object in order to follow the person.

In the conditions at timings [2], [3], and [4], movement is detected in only a part of the following feature points, whereas in the condition at timing [5], the following feature points have moved as a whole relative to the background.

The clip area setting unit 320 sets a clip area, or in other words a clipping size and a clipping position, to be used to clip a partial image out of the images on the respective frames constituting the input moving image on the basis of the motion detection results obtained by the motion detection unit 318. The clip area setting unit 320 sets the clip area of the image to include at least the tracking area, or in other words the part surrounded by the rectangle in the second image from the top of the four images shown at each of the timings in FIG. 4. Further, when the motion detection unit 318 detects movement in a feature point (in this specification, the feature point in which movement is detected will be referred to as a moving feature point), the clip area setting unit 320 sets the clip area of the image also to include the moving feature point.

This will now be described further with reference to the image shown at timing [1] in FIG. 4. At the timing [1], the motion detection unit 318 does not detect movement in any feature points. In this case, the clip area setting unit 320 sets the clip area such that an area of the tracking area part of the image, or in other words the face part of the image, occupies a larger part of the partial image. In other words, when the person serving as the main object exhibits less movement, the clip area is set such that the face part appears in close-up. A rectangle drawn to surround the face part in the third image from the top indicates the clip area set by the clip area setting unit 320. Further, the bottom image shows the partial image clipped from the input moving image on the basis of the clip area set by the clip area setting unit 320. Thus, the clip area setting unit 320 sets the size and position of the clip area on the basis of the motion detection results obtained by the motion detection unit 318 in relation to the following feature points such that when the amount of movement of the following feature points relative to the background within the input image decreases, an area ratio of the tracking area image within the clip area increases. In this specification, a mode in which the clip area is set in this manner will be referred to as a "clip area setting mode 1".

The image at timing [2] of FIG. 4 will now be described. At the timing [2], the motion detection unit 318 detects movement in the feature points corresponding to the elbow and hand parts of the right arm. In this case, the clip area setting unit 320 sets the clip area to surround the tracking area and the feature points in which movement was detected. A rectangle drawn to surround the face and right arm parts of the third image from the top indicates the clip area set by the clip area setting unit 320. Further, the bottom image shows the partial image clipped from the input moving image on the basis of the clip area set by the clip area setting unit 320. Thus, the clip area setting unit 320 sets the clip area to surround the tracking area and the feature points at which movement was detected on the basis of the motion detection results obtained by the motion detection unit 318 in relation to the following feature points. In this specification, a mode in which the clip area is set in this manner will be referred to as a "clip area setting mode 2".

The image at timing [3] of FIG. 4 will now be described. At the timing [3], the motion detection unit 318 detects movement in the feature points corresponding to the right hand and the left hand. In this case, the clip area setting unit 320 sets the clip area to surround the tracking area and the feature points at which movement was detected. A rectangle drawn to surround a part extending from the face to a tip of the left hand in the third image from the top indicates the clip area set by the clip area setting unit 320. Further, the bottom image shows the partial image clipped from the input moving image on the basis of the clip area set by the clip area setting unit 320. The clip area setting performed at the timing [3] also corresponds to the clip area setting mode 2.

The image at timing [4] of FIG. 4 will now be described. At the timing [4], movement is detected in the feature points corresponding to the right leg and the left leg in addition to the feature points corresponding to the right hand and the left hand. In this case, the clip area setting unit 320 sets the clip area to surround the tracking area and the feature points in which movement was detected. A rectangle drawn to surround a part extending from the face to the legs in the third image from the top indicates the clip area set by the clip area setting unit 320. Further, the bottom image shows the partial image clipped from the input moving image on the basis of the clip area set by the clip area setting unit 320. The clip area setting performed at the timing [4] also corresponds to the clip area setting mode 2.

The image at timing [5] of FIG. 4 will now be described. At the timing [5], the motion detection unit 318 determines that the following feature points have moved as a whole relative to the background. Hereafter, a case in which the following feature points move as a whole relative to the background will be referred to as whole movement relative to the background. Black arrows shown in the second and third images from the top indicate that whole movement relative to the background has been detected by the motion detection unit 318 and illustrate the direction of the whole movement relative to the background. In this case, the clip area setting unit 320 sets the clip area to surround the tracking area and the following feature points. In addition, the clip area setting unit 320 sets the clip area such that a larger amount of space is provided on the side of the direction of the whole movement relative to the background. A rectangle drawn to surround the part extending from the face to the legs such that a larger amount of space is provided in the movement direction of the person (the side to which the person is amount to move) in the third image from the top indicates the clip area set by the clip area setting unit 320. Further, the bottom image shows the partial image clipped from the input moving image on the basis of the clip area set by the clip area setting unit 320. Thus, having determined on the basis of the motion detection results obtained by the motion detection unit 318 in relation to the following feature points that the following feature points are moving as a whole in a single direction relative to the background of the input image, the clip area setting unit 320 sets the size and position of the clip area such that a larger amount of space is provided on the side of the clip area toward which the tracking area is moving. In this specification, a mode in which the clip area is set in this manner will be referred to as a "clip area setting mode 3". By performing clipping in this manner, a larger amount of space can be provided in the direction of a point of interest of the person or the like serving as the main object, thereby increasing the interest of a viewer of the moving image. Further, when a larger amount of space is provided on the side toward which the tracking area (the main object) is moving, an image having a more favorably balanced composition can be obtained.

When setting the clip area, as described above with reference to FIG. 4, a time delay is preferably set. More specifically, when the object serving as the tracking subject moves and stops repeatedly over time and the clip area is varied in accordance therewith, the clip area is preferably varied smoothly. The reason for this is that when the clip area is varied frequently, the clipped moving image becomes unpleasant to watch. Further, when varying the clip area, a previous clip area may be varied to the newest clip area suddenly, but is preferably varied at a speed not exceeding a predetermined variation speed. In the example described above, the clip area setting modes 1, 2 and 3 are provided as clip area setting modes, and one of the clip area setting modes 1 to 3 is selected and implemented on the basis of the following feature point motion detection result obtained by the motion detection unit 318. This invention is not limited to the above example, however, and any one or two of the clip area setting modes 1, 2 and 3 may be provided as the clip area setting modes. Further, a clip area setting mode other than the clip area setting modes 1, 2 and 3 may be provided. For example, a mode in which, when another object that moves in a similar manner to the person serving as the main object is detected, the clip area is set to surround the detected object and the main object may also be provided.

The image processing unit 308 cuts out the image corresponding to the clip area set by the clip area setting unit 320 from the images of the respective frames constituting the input moving image, and stores the clipped image temporarily in the buffer memory 322. The display control unit 330 controls the display device 130 such that the moving image and the clipped moving image generated by the processing of the image processing unit 308 are displayed on the display device 130.

The clip area indication processing unit 332 performs processing to indicate the clip area set by the clip area setting unit to the user of the digital camera 100. Any method that corresponds to the size of a display portion and so on of the display device 130 may be employed. For example, displaying the clipped moving image obtained in the clip processing on the display device 130, or displaying both the moving image not subjected to the clip processing and the clipped moving image side by side on the display device 130, may be employed as the clip area indication processing. Alternatively, a method of displaying the moving image not subjected to the clip processing and indicating the clip area on the moving image may be employed. At this time, a simple rectangular frame may be depicted, or the clip area of the input moving image may be differentiated from the remaining area by varying the contrast, lightness, and so on of the respective areas. The display control unit 330 displays the clip area on the display device 130 on the basis of a processing result obtained by the clip area indication processing unit 332.

The recording unit 340 stores still image data and moving image data generated by the image processing device 300. The recording unit 340 includes a built-in memory 342 or an external memory 344 that can be attached to and detached from the digital camera 100 freely. Alternatively, the recording unit 340 may include both the built-in memory 342 and the external memory 344.

The compression/expansion unit 350 performs processing to compress/expand the still image data and moving image data generated by the image processing device 300. A JPEG (Joint Photographic Experts Group) method may be used to compress the still image data. A Motion JPEG method, an MPEG (Moving Picture Experts Group) method, an H.264 method, or the like may be used to compress the moving image data. The compression/expansion unit 350 also performs processing to compress/expand audio data generated by the sound collecting unit 370, to be described below, using an AC3 (Audio Code number 3) method, an MP3 (MPEG Audio Layer-3) method, or the like.

Constitutional components of the image processing device 300 and operations thereof were described above. Next, other constitutional components of the digital camera 100 will be described.

The CPU 360 is electrically connected to the respective constitutional components of the image processing device 300 and the interface 354 via the system bus 352. The CPU 360 is also electrically connected to the respective constitutional components of the image pickup unit 306, the sound collecting unit 370, and the operating unit 380.

The operating unit 380 includes various switches, such as the release switch 104 and the power switch 106 described above with reference to FIGS. 1 and 2. The operating unit 380 may also include a touch panel switch or the like provided on the surface of the display device 130. The CPU 360 detects operating conditions of the operating unit 380, set by the user, and performs overall control of an operation of the digital camera 100. The CPU 360 also controls a sound collecting operation of the sound collecting unit 370 and outputs audio data output by the sound collecting unit 370 to the image processing device 300.

The sound collecting unit 370 includes one or a plurality of microphones that collect sound from the exterior of the digital camera 100, an analog front end that amplifies and initiates an A/D-conversion on a signal output from the microphone to generate a digital audio signal, and a digital signal processor that performs equalizing and filtering processing on the digital audio signal output from the analog front end. The sound collecting unit 370 performs the sound collecting operation on the basis of a control signal output from the CPU 360. It should be noted that the digital signal processor of the sound collecting unit 370 may be omitted, and instead, the digital audio signal may be processed by the image processing device 300. During moving image pickup, the CPU 360 generates a moving image file in a predetermined format, containing the image data generated by the image processing device 300 and audio data generated in the sound collecting operation of the sound collecting unit 370, and stores the generated moving image file in the recording unit 340. The recorded audio may be monaural or a multi-channel, for example stereo or surround. At this time, an orientation and a sensitivity of the sound collecting unit 370 may be varied in accordance with the clip area of the image.

The interface 354 includes one or both of a wired interface such as a USB (Universal Serial Bus) or an HDMI (High-Definition Multimedia Interface) and a wireless interface that uses a wireless communication technique employing light or radio waves, and is configured to be capable of transmitting and receiving the generated image file accommodating the image data and audio data to and from an external device.

FIGS. 5 to 9 are flowcharts schematically illustrating processing procedures of the tracking processing performed by the image processing device 300. It is assumed in the following description that the digital camera 100 is set in a moving image pickup mode with clipped moving image generation processing, and that execution of the processing begins when moving image pickup starts. It is also assumed that the tracking area has been set in advance before the start of the image pickup operation. The tracking area is set as an area including the face of a specific person (the tracking subject) through any of the processing that can be executed by the tracking area setting unit 310, described above with reference to FIG. 3.

In S500, the image processing device 300 performs face detection processing. In the face detection processing, an unspecified face existing in the input moving image is detected. One or a plurality of faces is detected in the face detection processing. In this description, face detection is performed, but instead, processing may be performed to detect a part other than a face, for example a head or the back of a head, as the tracking subject.

In S502, a determination is made as to whether or not a face to be set as a tracking subject exists. In other words, a determination is made in S502 as to whether or not a face matching the face in the tracking area exists among the faces detected in S500. Various methods may be used for this determination processing. For example, a determination may be made as to whether or not a face exists in the vicinity of a position where the tracking subject is highly likely to exist at a point in time of the processing of S500 on the basis of a position and a movement direction of the tracking area in a most recently obtained frame of the input moving image. When it is determined that a face exists in the vicinity of the position, the determination of S502 is affirmative, and a region including the face is set as a newest tracking area. When the determination of S502 is affirmative, the processing advances to S504, and when the determination is negative, the processing advance to S520.

In S504, the image processing device 300 performs feature point extraction/setting processing. This processing will be described in detail below with reference to FIG. 6, and is performed by the feature point derivation unit 312, following feature point setting unit 314, and background feature point setting unit 316 described above with reference to FIG. 3.

In S506, the image processing device 300 performs clip area setting processing. This processing will be described in detail below with reference to FIG. 7, and is performed by the clip area setting unit 320 described above with reference to FIG. 3.

In S508, processing is performed to clip an image out of an image on a single frame of the input moving image on the basis of the clip area set in S506, and store the clipped image in the buffer memory 322. The clipped image is recorded in the recording unit 340 and displayed on the display device 130 as required.

In S510, a determination is made as to whether or not continued following of the tracking subject is possible. As long as the determination remains affirmative, clipped moving image generation processing is performed by performing the processing of S506, S508, and S510 repeatedly. When the determination of S510 becomes negative, on the other hand, the clipped moving image generation processing is terminated, and thereafter, a clipped moving image clipped in a default clip area is recorded until the image pickup operation is terminated. Various default clip areas may be used. For example, the most recent clip area may be set as the default clip area, or an area occupying 50% of the area of a central part of the input moving image, for example, may be set as the default clip area. Alternatively, the entire input moving image may be set as the default clip area.

When a tracking subject does not exist or cannot be confirmed in the determination processing of S502, processing is performed in S520 to set the clip area at a default value (default setting of the clip area is as described above). Thereafter, a clipped moving image clipped in the default clip area is recorded until the image pickup operation is terminated.

Figure 5:
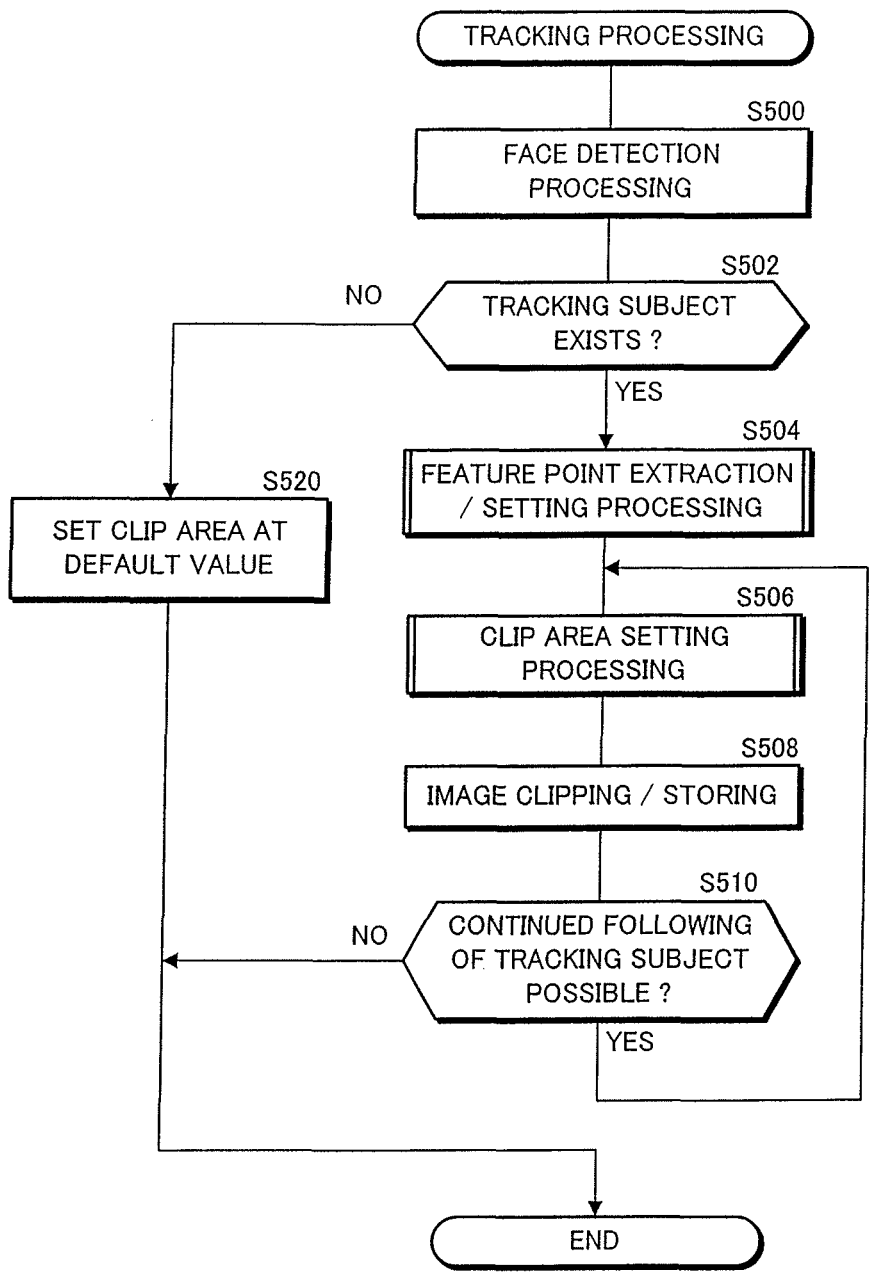
FIG. 5 is a flowchart showing procedures of tracking processing performed by the image processing device.
Figure 6:
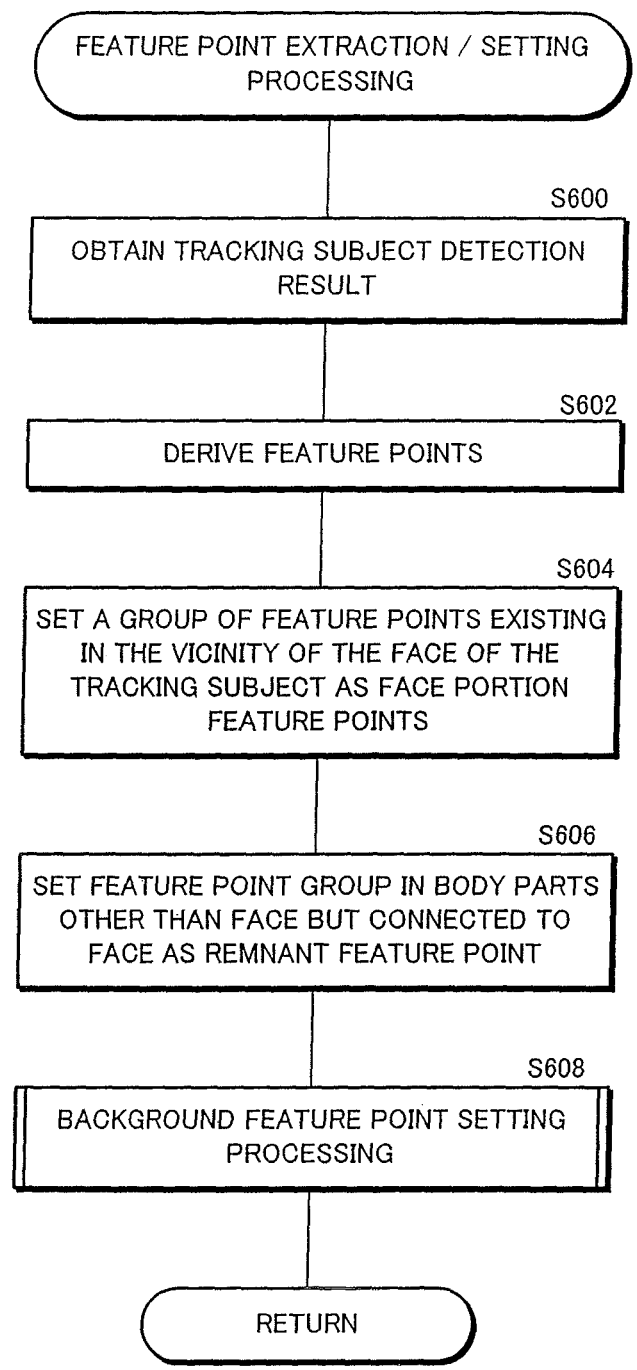
FIG. 6 is a flowchart showing procedures of feature point extraction/setting processing performed by the image processing device.

FIG. 6 is a flowchart illustrating in further detail the feature point extraction/setting processing executed in S504 of the flowchart shown in FIG. 5. In S600, the image processing device 300 obtains a tracking subject detection result. In other words, when it is determined in S502 that a face to be set as a tracking subject exists, a position and a range of a region surrounding the face (the tracking area) are determined within the input moving image, and therefore information relating to the position and range is obtained in S600.

In S602, the image processing device 300 derives feature points in the image on a single frame of the input moving image. In S602, processing is performed by the feature point derivation unit 312, as described above with reference to FIG. 3.

In S604, the image processing device 300 sets a group of feature points existing in positions on or close to the face of the tracking subject, from among the feature points derived from the processing of S602, as face portion feature points. Next, in S606, the image processing device 300 sets feature points in parts of the body other than the face that are connected to the face as remnant feature points. In the processing of S606, feature points that exhibit movement having a high degree of correlation to the movement of the face portion feature points derived in S604 are set as the remnant feature points on the basis of analysis results relating to the movement amount, movement direction, and movement timing of each feature point existing within the input moving image. In S604 and S606, processing is performed by the following feature point setting unit 314, as described above with reference to FIG. 3.

In S608, the image processing device 300 performs background feature point setting processing, to be described below with reference to FIG. 8. In S608, processing is performed by the background feature point setting unit 316, as described above with reference to FIG. 3. When the feature point extraction/determination processing of S600 to S608, described above, is complete, the routine returns to the processing of FIG. 5.

Figure 7:
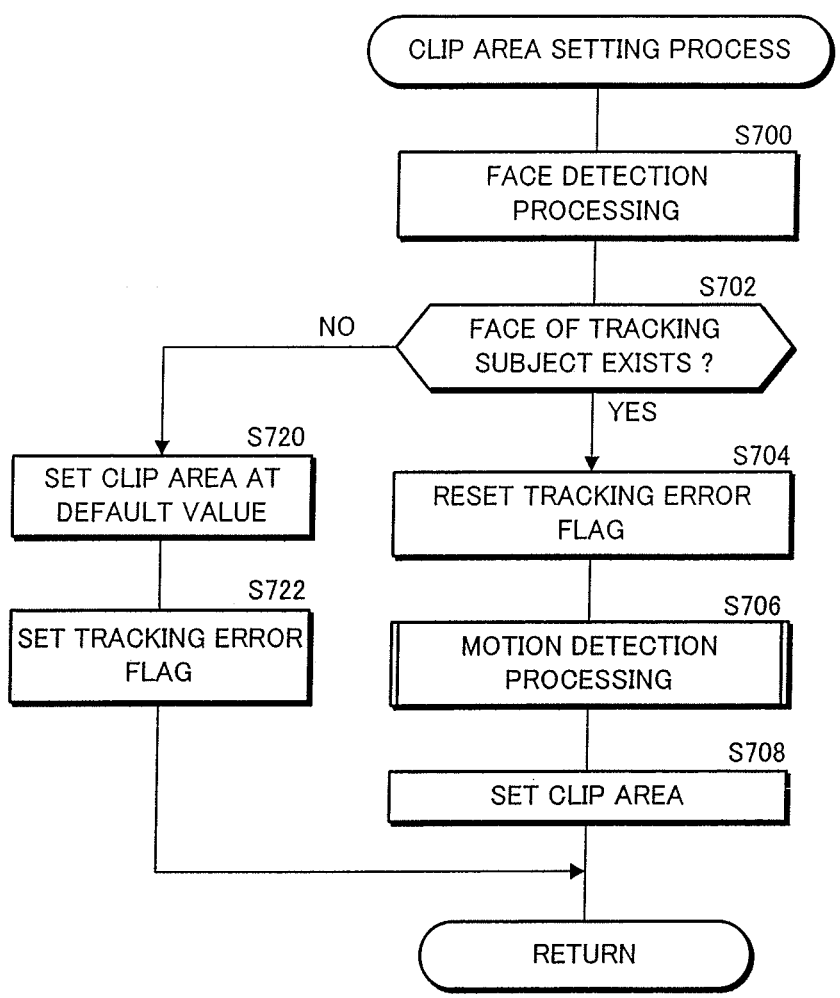
FIG. 7 is a flowchart showing procedures of clip area setting processing performed by the image processing device.

FIG. 7 is a flowchart illustrating in further detail the clip area setting processing executed in S506 of FIG. 5. In S700, the image processing device 300 performs face detection processing. The face detection processing is similar to the processing of S500 in the flowchart of FIG. 5, and is performed to detect an unspecified face in the input moving image. One or a plurality of faces is detected in the face detection processing. In S700, similarly to the processing of S500, processing may be performed to detect a part other than a face, for example a head or the back of a head, as the tracking subject.

In S702, a determination is made as to whether or not a face to be set as a tracking subject exists. The determination processing of S702 is similar to the processing of S502 in the flowchart of FIG. 5, and is performed to determine whether or not a face matching the face in the tracking area exists among the faces detected in S700, whereupon the region including the face is set as the newest tracking area. When the determination of S702 is affirmative, the processing advances to S704, and when the determination is negative, the processing advances to S720.

In S704, a tracking error flag is reset. The tracking error flag is a flag referred to in the processing of S510 in the flowchart of FIG. 5. More specifically, when the determination of S702 is affirmative such that continued following of the tracking subject is possible, the tracking error flag is reset. When the tracking error flag is reset, the determination of S510 becomes affirmative, or in other words it is determined that continued following o the tracking subject is possible.

In S706, the image processing device 300 performs motion detection processing to be described below with reference to a flowchart shown in FIG. 9. In S706, processing is performed by the motion detection unit 318, as described above with reference to FIG. 3. As a result of the processing of S706, feature points (moving feature points) marked with an x surrounded by a circle are set on the second image from the top of the images shown at each timing [1], [2], . . . , [5] in FIG. 4.

In S708, the image processing device 300 performs clip area setting processing. In S708, processing is performed by the clip area setting unit 320, as described above with reference to FIG. 3. More specifically, the size and position of a partial image to be clipped out of the image on each frame constituting the input moving image are set on the basis of the results of the motion detection processing performed in S706. In other words, the clip area is set to encompass the tracking area and the moving feature points.

In S720, which is the branch destination when the determination of S702 is negative, or in other words when it is determined that a tracking subject face does not exist, the image processing device 300 sets the clip area at a default value. This processing is similar to the processing of S520 in the flowchart of FIG. 5.

In S722, the tracking error flag is set. When the tracking error flag is set, the determination of S510 in the flowchart of FIG. 5 becomes negative. In other words, it is determined that continued following of the tracking subject is not possible. When the clip area setting processing of S700 to S722, described above, is complete, the routine returns to the processing of FIG. 5.

Figure 8:
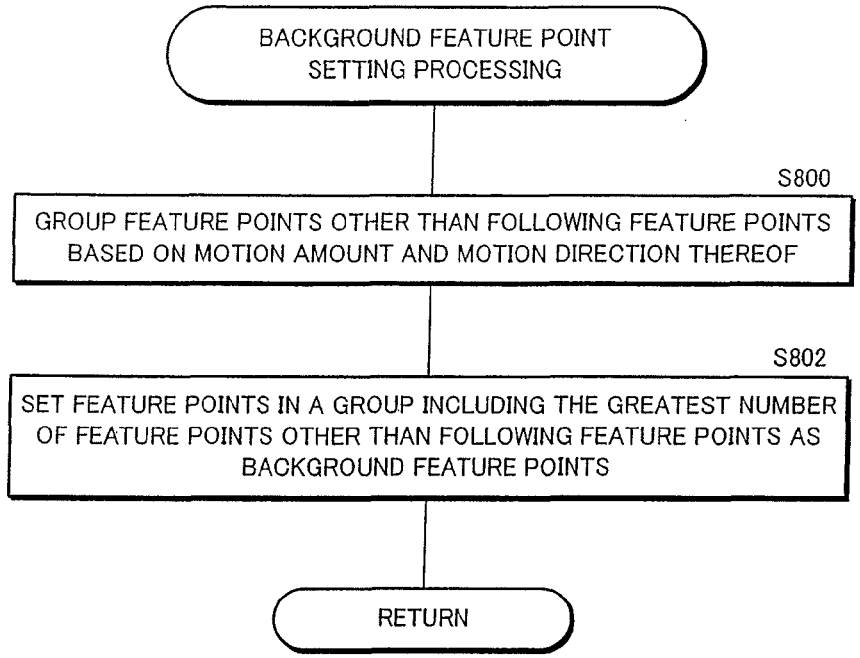
FIG. 8 is a flowchart showing procedures of background feature point setting processing performed by the image processing device.

FIG. 8 is a flowchart illustrating in further detail the background feature point setting processing performed in S608 of the flowchart shown in FIG. 6. In S800, the image processing device 300 groups the feature points other than the following feature points on the basis of the degree of correlation of the movement amount and movement direction of the feature points. As an example of the processing performed in S800, group attribute information indicating the group to which each feature point belongs may be attached to the registration information corresponding to each feature point.

In S802, the image processing device 300 performs processing to set the feature points in the group that includes the greatest number of feature points other than the following feature points as background feature points, as a result of the grouping processing performed in S800. When the background feature point setting processing constituted by the processing of S800 and S802 is complete, the routine returns to the processing of FIG. 6.

Figure 9:
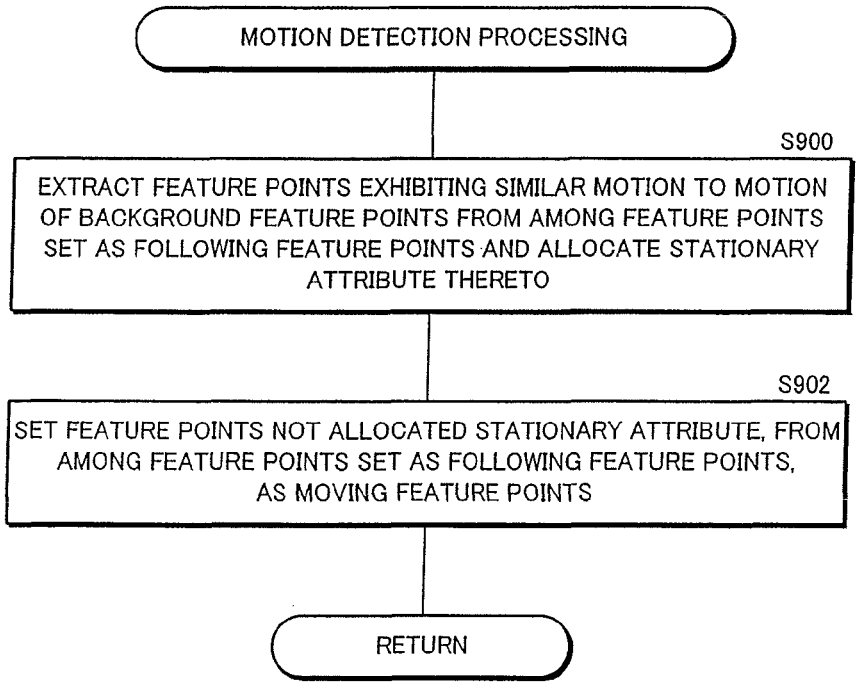
FIG. 9 is a flowchart showing procedures of motion detection processing performed by the image processing device.

FIG. 9 is a flowchart illustrating in further detail the motion detection processing performed in S706 of the flowchart shown in FIG. 7. In S900, the image processing device 300 extracts feature points exhibiting similar motion to the movement of the background feature points from the feature points set as the following feature points, and allocates a stationary attribute thereto. To describe this further, a feature point that exhibits similar movement to the background feature points is stationary relative to the background. For example, even in a situation where the person to be set as the tracking subject is standing motionless against a stationary background such as a wall, both the tracking subject and the background move within the input moving image when the digital camera 100 is panned or tilted. By performing the processing of S900 in this situation, it is possible to differentiate between the following feature points that exhibit movement relative to the background and the following feature points that do not.

In S902, the image processing device 300 sets the feature points that are set as following feature points but not allocated the stationary attribute as moving feature points. As a result, feature points that exhibit movement relative to the background feature points, from among the feature points set as the following feature points, are set as the moving feature points. When the movement detection processing constituted by the processing S900 and S902 is complete, the routine returns to the processing of FIG. 7.

By having the image processing device 300 execute the processing described above with reference to the flowcharts of FIGS. 5 to 9, the clip area in which the clipped moving image is to be clipped out of the input moving image is set automatically in accordance with the movement of the tracking subject. At this time, a region encompassing both the tracking area and the moving feature points is set as the clip area, and therefore, in a case where a person to be set as the main object moves an arm or an animal moves its tail, an image showing only the arm or an image showing only the tail can be prevented from being recorded. Further, as described with reference to FIG. 4, the clipping position and clip area of the image can be set in accordance with the detection result of movement of the tracking subject relative to the background, and therefore a moving image that attracts the interest of the viewer can be obtained.

This invention is not limited to the embodiment described above, and may be subjected to various amendments and applications within a scope that does not depart from the spirit of the invention. For example, in the processing illustrated in the flowchart of FIG. 5, the clip area is set at the default value when the tracking subject can no longer be followed, and thereafter, cutting out is performed in the default clip area. However, when the tracking subject is the face or the like of a specific individual registered in advance, the tracking subject may be recaptured by continuing to perform image recognition processing. In such a case, the processing of S502, S504, S506, S508, and S510 may be performed again.

Further, in the example described above, a clipped moving image is generated when the digital camera 100 is operated in the moving image pickup mode, but the clipped moving image may be generated by post-processing. More specifically, during a moving image pickup operation, an input moving image is recorded in the recording unit 340, and when the moving image pickup operation is complete, the input moving image is read from the recording unit 340 and processing is performed to generate a clipped moving image.

Furthermore, the clipped image generation processing may be performed by an image processing device of an apparatus other than the digital camera 100. For example, the digital camera 100 is connected to an image processing device such as a computer, a video recorder, and so on, and the input moving image from the digital camera 100 may be subject to the clipped moving image generation processing either in real time or after storing the input moving image by the image processing device. Alternatively, the clipped moving image generation processing by the image processing device may be performed on an input moving image stored on a memory card, an optical disk, and so on. When the clipped moving image generation processing is performed by a computer, the computer executes an image processing program for executing the processing described above on a computer. The image processing program is recorded on a non-transitory computer-readable medium such as a memory card, an optical disk, or a semiconductor memory. Alternatively, the image processing program may be downloaded from an external information processing device such as a server and stored in an auxiliary storage device or the like provided in the computer.

In the embodiment described above, an example in which this invention is applied to a digital still camera as an image pickup device was described. However, this invention may be applied to a digital video camera or another electronic machine.

What is claimed is:

1. An image processing device comprising:
a tracking area setting unit that sets a tracking area in an input moving image obtained by photographing an object;
a following feature point setting unit that detects a feature point that exhibits a motion in correlation with the motion of the tracking area and sets the detected feature point as a following feature point;
a motion detection unit that detects movement over time of the following feature point within the input moving image;
a clip area setting unit that sets a clip area of an image to be employed when a partial image including the tracking area is clipped out of the input moving image for either recording or displaying or both recording and displaying, and that sets a size and a position of the clip area on the basis of a motion detection result obtained by the motion detection unit;
a background feature point setting unit that detects and sets a background feature point, which is a feature point in a background part of the input moving image, on the basis of a movement amount and a movement direction over time of a plurality of feature points existing within the input moving image;
wherein the motion detection unit detects movement of the following feature point relative to the background feature point; and
the clip area setting unit sets the size and the position of the clip area on the basis of a detection result obtained by the motion detection unit in relation to a magnitude and a direction of the movement of the following feature point relative to the background feature point, such that when the movement of the following feature point relative to the background of the input moving image decreases, an area ratio of an image in the tracking area increases relative to the clip area.

2. The image processing device as defined in claim 1, wherein the tracking area includes a face area in which a facial image exists and a facial periphery area in a vicinity of the face area, and
the following feature point setting unit sets a face portion feature point, which is a feature point existing in the face area and the facial periphery area, and a remnant feature point, which is a feature point in a body part other than the face area but connected to the face area, as the following feature point.

3. The image processing device as defined in claim 2, wherein the clip area setting unit sets the size and the position of the clip area on the basis of the motion detection result obtained by the motion detection unit in relation to the following feature point such that the clip area encompasses both a following feature point at which motion is detected and the tracking area.

4. The image processing device as defined in claim 1, wherein the clip area setting unit sets the size and the position of the clip area on the basis of the motion detection result obtained by the motion detection unit in relation to the following feature point such that when the motion detection unit detects that the following feature point is moving as a whole in a single direction relative to the background of the input moving image, a larger amount of space is provided on a side of the clip area to which the tracking area is moving than on another side of the clip area.

5. The image processing device as defined in claim 1, further comprising a clip area indication processing unit that indicates the clip area set by the clip area setting unit.

6. The image processing device as defined in claim 1, further comprising:
a clip processing unit that clips an image out of the input moving image in the clip area set by the clip area setting unit; and
a clipped image recording unit that records the image clipped by the clip processing unit.

7. An image processing method comprising steps of:
setting a tracking area in an input moving image obtained by photographing an object;
detecting a following feature point, which is a feature point that exhibits a motion in correlation with the motion with the tracking area and setting the detected feature point as the following feature point;
detecting movement over time of the following feature point within the input moving image;
setting a size and a position of a clip area of an image to be employed when a partial image including the tracking area is clipped out of the input moving image for either recording displaying or both recording and displaying on the basis of a motion detection result obtained by the step of detecting movement;

detecting and setting a background feature point, which is a feature point in a background part of the input moving image, on the basis of a movement amount and a movement direction over time of a plurality of feature points existing within the input moving image;

detecting movement of the following feature point relative to the background feature point; and setting the size and the position of the clip area on the basis of a detection result in relation to a magnitude and a direction of the movement of the following feature point relative to the background feature point, such that when the movement of the following feature point relative to the background of the input moving image decreases, an area ratio of an image in the tracking area increases relative to the clip area.

\* \* \* \* \*